United States Patent Office 3,423,732
Patented Jan. 21, 1969

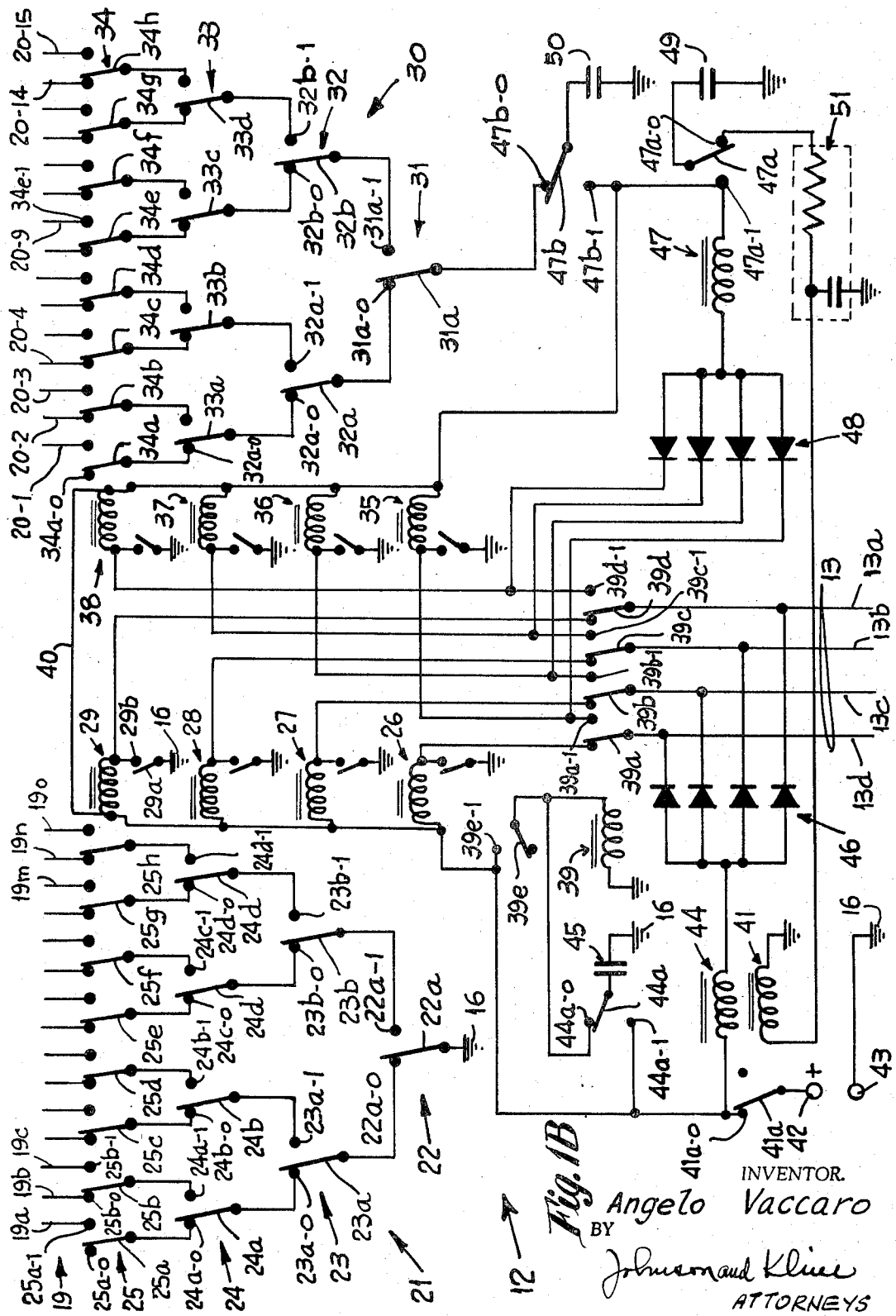

3,423,732
CHOSEN SELECTION TRANSMITTAL SYSTEM
Angelo Vaccaro, Port Washington, N.Y., assignor to Columbia Controls Research Corporation, Glen Cove, N.Y., a corporation of New York
Filed Jan. 16, 1967, Ser. No. 609,398
U.S. Cl. 340—166
Int. Cl. H04q 1/30
9 Claims

ABSTRACT OF THE DISCLOSURE

The herein disclosed invention relates to a remote station having a plurality of selections with each being individually represented as by alphabetical or numerical or both codes and being independently choosable with the identity of the chosen selection being converted into a binary code and transmitted to a central station where it is decoded into its originally representative code for utilization.

Figure 1C:
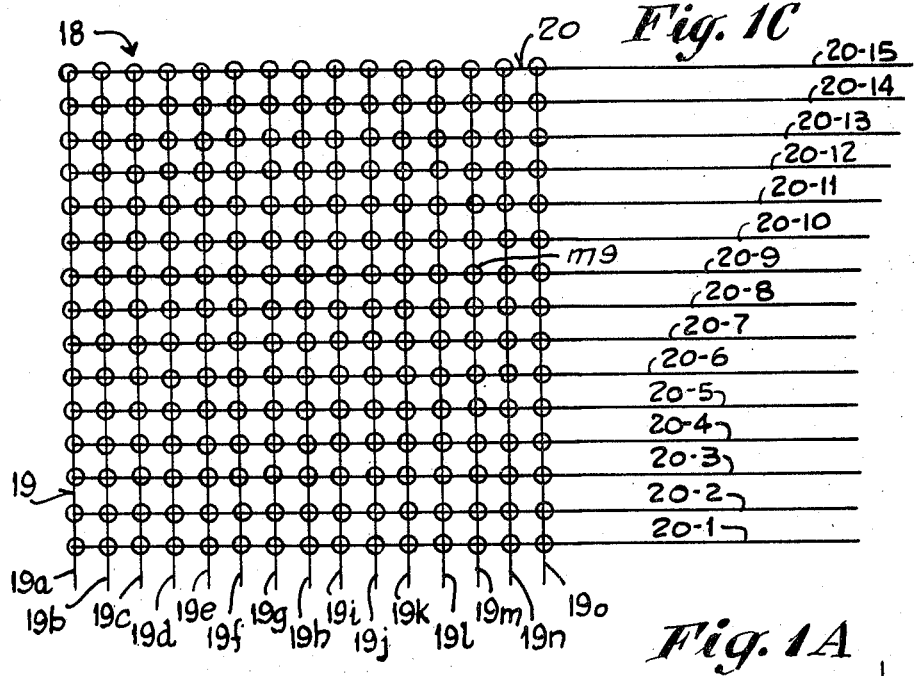

In many instances it has been found desirable to enable a user to choose one selection from a plurality of selections and then transmit the choice to a utilization area where it is subsequently acted upon. In applications where the location of selection and the location of utilization are remote from each other, the transmission may be effected by electrical signals over wires interconnecting the two places. The signal may consist of a different tone or of a number of energizations or time pulse relation for each selection but in any event the chosen selection is translated into its own unique electrical representation which is decoded and utilized at the central station as the information of the chosen selection. Though such systems are heretofore known, they have not been found completely satisfactory by reason of the number of interconnecting wires, the relatively complicated and expensive translating and decoding apparatus, the limiting of the total number of selections available to a small number, etc.

It is accordingly an object of the present invention to provide a system for transmitting information of a selection chosen from a plurality of selections from one location to another which is extremely simple in construction and economical to produce.

Another object of the present invention is to achieve the above object but yet be capable of having an exceedingly large number of selections from which to choose with only few parts but yet which is extremely rapid in transmitting the information.

A further object of the present invention is to provide a system for transmitting the information of a chosen selection which is extremely durable and reliable in use by being composed of few mechanical parts.

In carrying out the present invention the central station which receives the transmitted information may utilize it immediately to actuate a mechanism or humanly perceptible signal such as numbered lights, etc. or store the same for subsequent use by a mechanism when the latter is in condition to accept and act on it. In the hereafter disclosed embodiment the information is received by the central station and then stored in a memory unit for subsequent utilization. One mechanism which is normally incapable of reacting immediately to transmitted information is a phonograph record playing machine and thus the information of the record selected to be played must be stored until a previously selected record has been played. Thus the present system is disclosed in a form which is used to set a condition of a storage means which condition is representative of the chosen selection and from which such information may be processed.

The system includes at least one remote station having a plurality of manually operable switches which are individually identifiable to facilitate the choice of the selection. A plurality of wires interconnects the remote station with a central station and the latter has a memory storage means that, hereinafter disclosed, may consist of a plurality of bi-state means, such as magnetic toroid cores with there being a core for each selection. The cores may be considered to be arranged in a square having alphabetically indicated horizontal lines and numerically delineated vertical lines such that upon energization of one alphabetic line and one numerical line only one of the cores will assume its set condition with the core being identified by a letter and a number.

For controlling the energization of the alphabetic line there is provided a first tree which consists of a plurality of rows of relays with the number of contacts in each row increasing numerically by a binary exponential series. Thus the first row will have one 2-contact switch, the second row two 2-contact switches, the third row four 2-contact switches, etc. Similarly the numerical lines will have a binary tree of a plurality of rows with the rows having interconnected two contact switches that increase numerically from row to row by a binary exponential series. Each row in each tree is preferably actuated by a relay so that all contacts in each row will be either in the 0 state when the row relay is not energized and in the 1 state when the row relay is energized.

In the hereafter disclosed embodiment, each binary tree is composed of four rows and thus is capable of controlling the energization of fifteen lines. With such a number, it will be appreciated that the system is capable of selecting any one of a total of 225 selections. By controlling the energization of the relays, according to a binary system, a selection of any one of the fifteen lines in each tree may be made by having only four wires, one for each relay in the tree. Thus only four wires are needed to supply the information capable of causing a tree to assume a condition representative of the selection made.

The remote station in which manual or automatic selection is made from a plurality of selections such as 225, consists of 15 operable switches such as single throw momentary contact switches. A diode network interconnects each switch to the four interconnecting wires that are connected between the tree located in the central station and the remote station. By operation of one of the selecting buttons which are connected to a switch, the diode network translates the switch selected into a binary code of energization on the four wires which in turn causes the tree to assume a binary condition representative of the switch selected and hence energize the line corresponding to the selection.

Upon selecting for example the alphabetical line the system functions to shift the connection of the four wires from the alphabetical tree to the numerical tree. A subsequent operation of one of the fifteen buttons will cause its binary representation to appear in the four leads which in turn will cause the numerical tree to energize the one numerical line corresponding thereto. With the alphabetical line and the numerical line both energized, the core that is representative thereof will be caused to assume its one state and hence store the selection for subsequent utilization in the central station.

Other features and advantages will hereinafter appear.

Figure 1A:
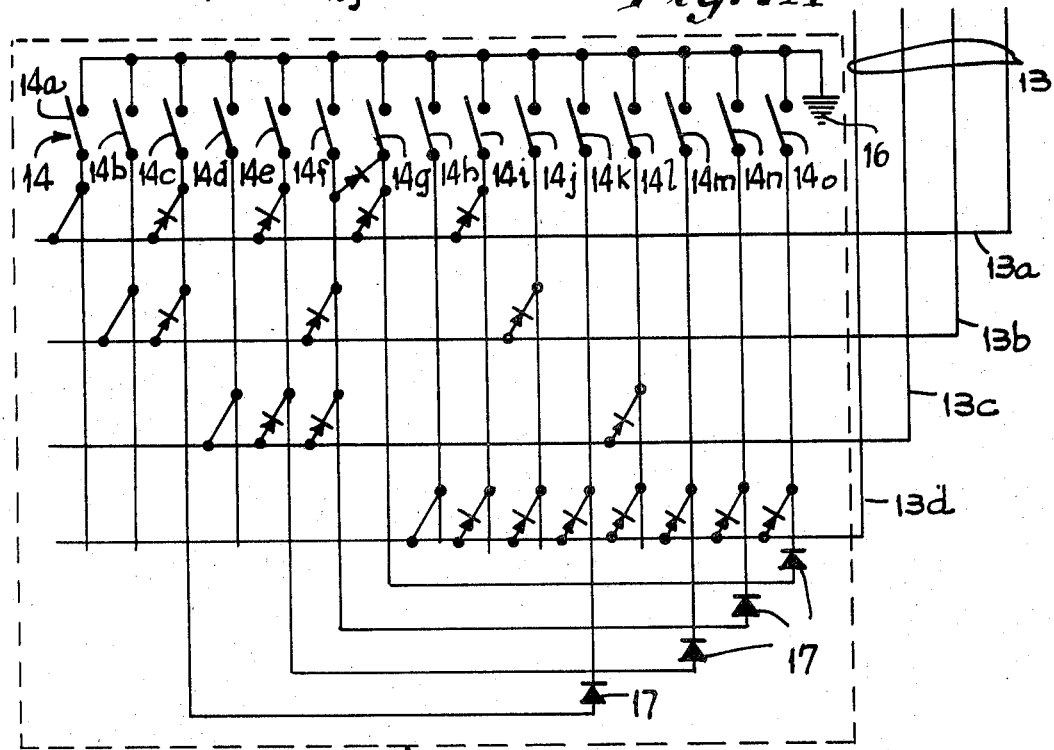

In the drawing, the only figure is a schematic drawing of the chosen selection transmittal system and is composed of portions denoted FIG. 1A, FIG. 1B and FIG. 1C.

Referring to the drawing, the chosen selection transmittal system is generally indicated by the reference numeral 10 and includes a remote station 11 enclosed within dotted line 11a (FIG. 1A) and a central station 12 shown in FIG. 1B. A plurality of wires 13 intercon nects the two stations. While only one station is shown, it will be appreciated that others may be interconnected in a similar manner by being connected either in parallel to the wires 13 or by having separate wires 13 thereto with a common junction in the central station.

The remote station 11 includes in the embodiment shown fifteen normally open switches 14a–14o, each of which may be independently operated and are of the single pole, single throw, press to close type. The contacts of all the switches are connected in parallel to a common line 15 that in turn is connected to a ground 16. Within each remote station 11, a plurality of diodes 17 and branches interconnect the switch arms of the switches 14a–14o with the leads 13a–13d so that the diode circuit will connect the leads 13a–13d through the switches to the ground 16 in a manner which energizes them according to a binary code. One specific type of diode circuit is shown and such a circuit has been found to reduce the diodes needed over a conventional type of diode circuit.

In the remote station, when the switch 14a is closed, only the lead 13a is connected to ground and this corresponds to the binary condition 0001 wherein the last digit represents the lead 13a, the penultimate digit the lead 13b, the second digit the lead 13c and the first digit the lead 13d. For the switch 14b being closed, only the lead 13b will be connected to ground corresponding to the binary condition 0010. For the switch 14d being closed, the lead 13c has an electrical condition so the leads 13 correspond to the binary condition 0100. For the switch 14g being closed, only the lead 13d may have the electrical condition and the leads correspond to the binary code 1000. For the closure of any of the other switches, a binary condition will appear in the four leads which corresponds to the numerical position of the letter in the alphabet. Thus the letter n is 14th in the alphabet and its selection will cause binary representation of 1110 to occur. While they are not shown in the drawing, it will be understood that manually actuatable switch actuators, such as buttons, may be connected to each switch and each button may be identified by an alphabetical designation or a numerical designation or both.

Within the central station 12, there is provided a memory matrix 18 (FIG. 1C) which consists of a plurality of toroid cores that are formed in an electrical square to have alphabetical rows 19 and numerical rows 20. Connected to each of the alphabetical rows is a lead designated 19a–19o respectively, while connected to each of the numerical rows 20 are leads designated 20–1 through 20–15. The memory matrix 18 is of conventional construction in that a core has an alphabetical and a numerical designation with the designation for each core being unique unto itself and the designation identifies to which alphabetical row and to which numerical row the core is connected with all cores in a row being serially connected together. Thus for example a core designated h–8 is in the alphabetical row connected to the lead 19h and in the numerical row connected to the lead 20–8. The memory matrix stores a selection by having the core corresponding to the selection assume a magnetized state which is achieved by energizing both rows with which the core is associated, such energization consisting of a voltage pulse passed through the numerical and alphabetical rows connected to the leads of the core.

The alphabetical leads 19a–19o are connected to an alphabetical tree 21 which consists of four rows 22, 23, 24 and 25 of contacts that are serially connected from the first or input row 22 to the last or output row 25. The row 22 has one arm 22a that is connected to the ground 16. The row 23 has two arms 23a and 23b with the arm 23a being connected to the contact 22a–0 and the arm 23b being connected to the contact 22a–1. The row 24 has four arms 24a through 24d with the arms being respectively connected to the contacts 23a–0, 23a–1, 23b–0 and 23b–1. The row 25 has eight arms 25a, 25b, 25c, 25d, 25e, 25f, 25g and 25h with each arm being connected to contacts 24a–0, 24a–1, 24b–0, 24b–1, 24c–0, 24c–1, 24d–0 and 24d–1, respectively. The arms 25a through 25h are connected to the alphabetical leads 19 of the memory matrix in the manner shown except for contact 25a–0 which is not connected to any lead and constitutes the deenergized or rest position of the tree. Thus the contact 25a–1 is connected to line 19a, contact 25b–0 is connected to the line 19b, contact 25b–1 is connected to the line 19c, etc.

The arm in the row 22 is part of a relay 26, the arms in the row 23 are part of a relay 27, the arms in the row 24 are part of a relay 28 and the arms in the row 25 are part of a relay 29. It will be appreciated that the relays 26 through 29 when unenergized, have their associated arms connected to the contact denoted by the 0 in the contact reference character while the arms of the energized relays are connected to the contacts having a 1 in the contact reference character.

Each of the relays 26 through 29 are of the self-locking type in that upon energization they will maintain their energized condition until power thereto is interrupted when they will revert to their unenergized condition. For example, as typical of the other relays, the relay 29 has an arm 29a connected between the ground 16 and a contact 29b connected to the coil and when the relay is energized the arm 29a engages the contact 29b to provide a holding circuit through the coil.

The numerical lines 20 of the memory matrix 18 are connected to a numerical tree 30 which is of identical construction to the alphabetical tree 21. The tree 30 has a first or input row 31 having an arm 31a; a second row 32 having arms 32a and 32b; a third row 33 having arms 33a, 33b, 33c and 33d and a fourth or output row 34 having arms 34a–34h. A relay 35 is connected to operate the arm 31a; a relay 36 is connected to operate the arms 32a and 32b; a relay 37 is connected to operate the arms 33a–33d and a relay 38 is interconnected to operate the arms 34a–34h. The various arms are interconnected to the preceding row of contacts in a manner similar to that disclosed with respect to the alphabetical tree 21. As examples, arm 32a is connected to the contact 31a–0; arm 32b to the contact 31a–1; arm 33a to the contact 32a–0; arm 33b to the contact 32a–1; arm 33c to the contact 32b–0; the arm 33d to the contact 32b–1, etc. Each of the contacts in the row 34 are connected to one of the lines 20–1 through 20–15 respectively except for the contact 34a–0 which is the rest or deenergized position of the tree 30.

The relays 35 through 38 are similiar in construction to the relays 26–29 in that each has a holding circuit for maintaining energization of the coil until power is interrupted.

The leads 13a–13d are each connected to an arm 39a, 39b, 39c and 39d operated by a relay 39. The arms 39a–39d are shown in solid lines in the state that occurs when the relay 39 is unenergized and thus the arms connect the leads 13a–13d to the relays 29, 28, 27 and 26 respectively. When the relay 39 becomes energized, the arms 39a–39d shift their position and connect the leads 13a–13d to the relays 38, 37, 36 and 35 respectively through the other contacts that they engage.

The relays 26–29 and 35–38 are connected in parallel to a common lead 40 which is connected through a contact 41a–0 and an arm 41a to a positive source of electrical energy 42. The other terminal 43 of the source is connected to the ground 16. Thus current may flow, if connected as will be hereinafter explained, from the positive source terminal 42 through the relays 26–29 or 35–38 and the leads 13 to the ground 16 located in the remote station 11.

The arm 41a is shown in the deenergized position of the relay 41 and as such engages the contact 41a–0. The relay 41 accordingly controls the flow of power throughout the system and is normally set to have power flow but will intercept it whenever energized.

A relay 44 as an arm 44a that is connected through a condenser 45 to the ground 16 and it engages the contact 44a-0 that is connected to arm 39e of relay 39 when the relay 44 is unenergized, while when the relay is energized, the arm engages the contact 44a-1 that is connected to the lead 40. For energizing the relay 44, there are four parallelly connected diodes 46 each of which is connected to one of the leads 13. Upon any one of the leads 13 being connected to the ground 16, the relay 44 becomes energized to shift the arm 44a to the contact 44a-1 and connect the condenser 45 to the lead 40 and hence the positive source to charge the condenser. When the contact 44a-0 is subsequently engaged by the arm 44a, the condenser 45 is connected to the relay 39 and can discharge thereto to effect energization thereof.

A relay 47 has a coil connected through parallelly arranged diodes 48 to the leads connecting the relays 35-38 to the contacts 39a-1 through 39d-1. Upon the connections of any one of the four leads 13a-13d to the ground with the relay 39 energized, the relay 47 becomes energized. The arm 47a of the relay 47 is connected to a condenser 49 while the arm 47b is connected to a condenser 50 with both condensers having their other side connected to ground. The arms in the unenergized state of the relay assume the solid line position when they engage contacts 47a-0 and 47b-0. In the energized position the arms engage contacts 47a-1 and 47b-1 both of which are connected to the lead 40. The contact 47a-0 is connected to an RC network 51 which in turn is connected to the coil of relay 41. The contact 47b-0 is connected to the arm 31a of the tree 30 which serves as the input to the tree.

In the operation of the system, the relays are all in their deenergized position so that their associated arms engage the contact that has a 0 in its reference character. Upon choosing a selection which for ease of explanation has both an alphabetical and a numerical designation as the switches 14a-14o are used for both designations, the user causes the switch in the remote station associated with the alphabetical portion of the selection to be momentarily closed. Upon release of the alphabetical switch, the user then manipulates one of the switches again which has the numerical designation to provide the numerical portion of the selection. With the alphabetical portion of the selection being assumed to be m, the switch 14m of the selection being assumed to be m, the switch 14m will be closed by the user. This will connect the ground 16 through the diode network 17 to the leads 13d, 13c and 13a which places the binary representation 1101 therein. As at least one of the leads 13 is connected to ground and the relay 41 is not energized, current will flow from the source 42 through contact 41a-0 to the relay 44, through one of the diodes 46 to the leads 13a, 13c and/or 13d causing energization of the relay 44. Contact 44a-1 be engaged causing the condenser 45 to become charged. The relay 39 is in its unenergized position and the arms 39a-39d connect the leads 13a-13d to the relays 29 through 26 inclusive respectively which enables the circuit to be completed from the source 42 through the relays 26, 27 and 29 effecting their energization. These relays will maintain their energized position by reason of their locking circuit after release of the switch 14m.

In the alphabetical tree 21, the arms in the rows 22, 23 and 25 engage their contacts having the reference character 1 while the arms in the row 24 will maintain engagement with their contacts having a 0 in their reference character. The ground 16 is thus connected to arm 22a, arm 23b, arm 24d, arm 25g and contact 25g-1 which is the contact connected to the line 19m of the memory matrix 18. There is no other connection to an output contact from the ground 16.

The manual release of the switch 14m causes it to attain its open position, the relay 44 becomes deenergized and switch arm 44a connects the condenser 45 to the relay 39. The condenser 45 discharges through the relay 39 to energize it and it is maintained energized through the contact 39e-1. The contact arms 39a-39d will shift to engage their other contacts and connect the leads 13a-13d to the relays 38-35 respectively.

The system is then in position to enable the user to close any one of the switches 14a-14o which corresponds to the numerical portion in the selection chosen. If the number is 9 which with the alphabetical portion m indicates that the selection is "m9," the leads 13a and 13d only will be connected to the ground 16 by the diode network 17 in the remote station. This in turn through the arms 39a-39d will cause relays 35 and 38 to become energized. Additionally, through the diodes 48 the relay 47 will become energized. With the relays 35 and 38 only energized, the arm 31a is connected to the arm 32b, which is connected to the arm 33c, which is connected to arm 34e and the latter arm engages its contact 34e-1. This contact is connected to the lead 20-9 in the numerical line 20. Additionally, through the diodes 48, relay 47 becomes energized to connect the arms 47a and 47b to the positive source causing charging of the condensers 49 and 50.

Upon release of the switch 14-i, the relay 47 will become deenergized, connecting the charged condenser 50 to the arm 31a. The charge in the condenser 50 will be directed through the numerical tree 30 to only the numerical lead 20-9 and pass from the memory cal lead 20-9 to the core m9 and pass from the memory matrix through the alphabetical lead 19-m to the ground 16. This causes only the core m9 to respond and assume its other state and the selection m9 is accordingly stored.

The deenergization of relay 47 also connects the charged condenser 49 through the RC delay network 51 to the relay 41. After a slight time interval determined by the value of the components in the network 51, the charge of the condenser 49 causes momentary energization of the relay 41 and its energization causes the arm 41a to become disengaged from contact 41a-0 and assume an open circuit position. The lead 40 is then disconnected from the positive source 42 and the relays 26, 27, 29, 35, 38 and 39 become deenergized. The system is then ready to receive the next selection from the remote station. Also, whenever desired, the selection stored m9 may be subsequently utilized.

While the use of a memory matrix having toroid cores is herein disclosed, it will be appreciated that other and different types of memory matrixes may be employed or if desired, eliminated and the selection used immediately In any event, the actuated element will be required to be energized by both trees.

The remote station has been indicated as having fifteen switches which with a double use of each switch provide a total number of selections of 225. With only seven switches, three rows in each tree and three leads in the leads 13, the total number of selections is 49. Increasing the selection to a total of 961 would require 31 switches five rows in the trees and five leads in the leads 13. It wi thus be seen that the total number of selections may b easily varied within wide limits with only few changes i the system.

The system has been disclosed as having the bank of switches 14 operated twice for each selection. If desire another bank of switches may be added at the remote st: tion and a relay operable like the relay 39 connected the leads 13 to enable shifting from one bank to anoth without increasing the number of leads 13.

The number of selections may also be easily increase without increasing the number of wires 13 interconnecti the remote station and the central station by serially ad ing another tree to one or the other or both of the trees and 30. Thus with another tree added only to the alpl betical tree 21, the total number of selections is doubl to 450 selections with each selection requiring to be des nated by two letters and one numeral. An example of t manner in which trees may be serially connected is sho in U.S. application Ser. No. 376,145, entitled Key Calling Telephone Station and assigned to the assignee of the present invention.

It will accordingly be appreciated that there has been disclosed a system which enables the choosing of any one of a plurality of selections at a remote station and transmits the information to a central station for utilization. The chosen selection may be identified in any desired manner as by letters or numbers or combinations thereof and the selection is translated into a binary representation of an electrical condition in a plurality of wires interconnecting the remote station and the central station. At the central station the binary representation is translated into the only electrical connection which corresponds to the chosen selection and electrical commands may be thus directed by the electrical connection to perform a desired operation. The number of total selections from which to choose is easily increased without increasing the number of interconnecting wires by the use of two translating devices in the central station. Each selection has two part identification with the first part electrical representation being directed to one translating device and the second part electrical representation being directed to the other translating device. The electrical connections to the outputs of the two devices may then be used to direct a signal to the one unit in the central station which is designated to have response to the choice of the chosen selection.

I claim:

1. A chosen selection transmittal system for transmitting the choice of one selection from a plurality of selections at a remote station to a central station for utilization comprising a remote station having a plurality of individually operable switches with there being one for each selection, a plurality of wires extending from said remote station to said central station with there being more switches than wires, means in said remote station for connecting the wires to the switches to have the wires assume an electrical condition representative of a binary code for each selection with each selection having a different binary representation, a binary tree in said central station having an input and a plurality of individual outputs with there being an output for each selection, means connected to the wires and to the binary tree to have the tree assume a condition identical to the binary representation in the wires so as to have the input connected through the tree to the one output corresponding to the chosen selection, utilization means connected to each output, means for passing a signal to the utilization means between the input and the one output, and in which the signal passing means is interconnected with the wires and includes means for blocking passage of the signal until after removal of the binary condition from the wires.

2. The invention as defined in claim 1 in which there are means for maintaining the binary tree in its binary representing condition until after the passing of the signal and means for releasing the maintaining means after the supplying of the signal.

3. A chosen selection transmittal system for transmitting the choice of one selection from a plurality of selections at a remote station to a central station for utilization comprising a remote station having a plurality of individually operable switches, a plurality of wires extending from said remote station to said central station, means in said remote station for connecting the wires to the switches to have the wires assume an electrical condition representative of a binary representation for each selection with each selection having a different binary representation, utilization means interconnected with said central station and having a plurality of responsive units, said units being arranged in first and second lines to have the one unit respond which corresponds to energization of both its lines, a first and a second binary tree in said central station with each tree having an input and a plurality of outputs, means connecting the outputs of the first tree to the first lines with each line having an individual output, means connecting the second tree to the outputs of the second lines with each line having an individual output, means connecting the wires to one of the trees to cause said tree to assume a condition representative of the binary condition of the wires to connect its input to the individual output representative of the binary representation, means for shifting the wires to be interconnected to the other tree to cause said other tree to assume a condition representative of the next binary condition in said wires and to connect its input to the individual output representative of the binary representation and means for passing an electrical command to said utilization means through said trees to cause response of the one unit.

4. The invention as defined in claim 3 in which there are means for maintaining the trees in a condition representative of the binary representation and means for deactivating the maintaining means after the passing of the electrical command.

5. The invention as defined in claim 4 in which the deactivating means includes time delay means and means actuating the time delay means occurs concurrently with the passing of the electrical command.

6. The invention as defined in claim 3 in which the means for shifting the wires from the first tree to the second tree includes means responsive to the termination of the first binary representation in the wires.

7. The invention as defined in claim 6 in which the means for shifting includes means for maintaining the wires connected to the second tree until after the passing of the electrical command.

8. The invention as defined in claim 3 in which the utilization means consists of storage means, in which the responsible units are bistable devices and in which each bistable device has a unique combination of first and second lines.

9. The invention as defined in claim 3 in which the total number of selections in each tree is no greater than one less than the resultant of a binary exponential series raised to the power corresponding to the number of wires, in which each tree has a number of outputs corresponding to said resultant and in which the number of said switches corresponds to said resultant.

References Cited

UNITED STATES PATENTS

| | | |
|---|---|---|
| 3,234,335 | 2/1966 | Keister. |
| 3,308,433 | 3/1967 | Lochinger. |
| 3,317,676 | 5/1967 | Ekbergh et al. |
| 3,328,533 | 6/1967 | Vaccaro et al. |
| 2,386,482 | 10/1945 | Leathers et al. |
| 2,583,032 | 1/1952 | Waterman et al. |
| 2,611,814 | 9/1952 | Law. |
| 2,859,276 | 11/1958 | Saykay. |
| 2,939,121 | 5/1960 | Saykay. |
| 2,959,775 | 11/1960 | Marcus. |
| 2,965,887 | 12/1960 | Yostpille. |
| 2,972,015 | 2/1961 | Saykay. |
| 3,021,509 | 2/1962 | Swartz _____ 340—166 |
| 3,110,772 | 11/1963 | Hayward. |
| 2,749,484 | 6/1956 | Levitt _____ 340—166 XR |
| 2,844,811 | 7/1958 | Burkhart. |

DONALD J. YUSKO, *Primary Examiner.*

U.S. Cl. X.R.

340—147